United States Patent [19]

Kobayashi et al.

[11] Patent Number: 4,694,707
[45] Date of Patent: Sep. 22, 1987

[54] ROD SEAL DEVICE FOR STIRLING ENGINES

[75] Inventors: Daisaku Kobayashi; Tunesaku Itaba, Kashiwazaki; Yutaka Momose, Anjyo, all of Japan

[73] Assignees: Kabushiki Kaisha Riken, Tokyo; Aisin Seiki Kabushiki Kaisha, Aichi, both of Japan

[21] Appl. No.: 828,664

[22] Filed: Feb. 12, 1986

[30] Foreign Application Priority Data

Feb. 20, 1985 [JP] Japan ............... 60-23261[U]

[51] Int. Cl.⁴ .................. F16H 57/02; B01D 19/00
[52] U.S. Cl. ...................... 74/606 A; 55/70; 55/46
[58] Field of Search .............. 74/606 A; 55/38, 40, 55/43, 46, 70; 60/517

[56] References Cited

U.S. PATENT DOCUMENTS

| 2,350,123 | 5/1944 | Mercier | 277/212 F |
| 2,405,152 | 8/1946 | Kilchenmann | 277/212 |
| 2,515,647 | 7/1950 | Hunt et al. | 55/166 |
| 2,554,622 | 5/1951 | Jones | 277/212 F |
| 2,561,884 | 7/1951 | Perrow | 277/212 C |
| 2,720,280 | 10/1955 | Doyle | 55/46 |
| 2,894,037 | 7/1959 | Kindler | 55/46 |
| 2,906,367 | 9/1959 | Vandenburgh | 55/46 |
| 2,909,241 | 10/1959 | Rummert | 55/46 |
| 3,273,313 | 9/1966 | Livesey et al. | 55/46 |
| 3,367,682 | 2/1968 | Meriano | 277/212 |
| 3,424,371 | 1/1969 | Happe | 55/70 |
| 3,486,297 | 12/1969 | Elsinga et al. | 55/166 |
| 3,495,382 | 2/1910 | Adamik | 55/166 |
| 3,691,730 | 9/1972 | Hickey et al. | 55/166 |
| 3,934,396 | 1/1976 | Stahlecker et al. | 74/606 A |
| 4,055,352 | 10/1977 | Allinquant et al. | 277/212 C |
| 4,089,662 | 5/1978 | Williams | 55/166 |
| 4,149,566 | 4/1979 | Stowe | 277/212 C |
| 4,317,436 | 3/1982 | Barnhart et al. | 277/212 C |
| 4,399,999 | 8/1983 | Wold | 277/212 F |
| 4,601,235 | 7/1986 | Roberts | 277/212 C |

FOREIGN PATENT DOCUMENTS

| 234499 | 7/1964 | Austria | 55/165 |
| 238521 | 2/1965 | Austria | 277/212 F |
| 1021665 | 12/1957 | Fed. Rep. of Germany | 277/212 |
| 2126610 | 10/1972 | France | 55/165 |
| 0611050 | 5/1978 | U.S.S.R. | 74/606 A |
| 0626289 | 9/1978 | U.S.S.R. | 74/606 A |

OTHER PUBLICATIONS

Product Engineering, vol. XXI, Issue 12, p. 78, 12/1950, Author Elliott.

*Primary Examiner*—Gary L. Smith
*Assistant Examiner*—Vinh Luong
*Attorney, Agent, or Firm*—Burns, Doane, Swecker & Mathis

[57] ABSTRACT

A rod seal device for a Stirling engine includes a piston rod connecting operating piston and a guide piston latter being served as a power take-off device, various seal members disposed between the two pistons and surrounding the outer peripheral portion of the rod. The seal device further includes a plurality of chambers disposed around the outer periphery of the rod between a working chamber of the engine and a working chamber of the power take-off for discharging any gas leaked therefrom or preventing any undesired mixture of the two different working gases.

3 Claims, 2 Drawing Figures

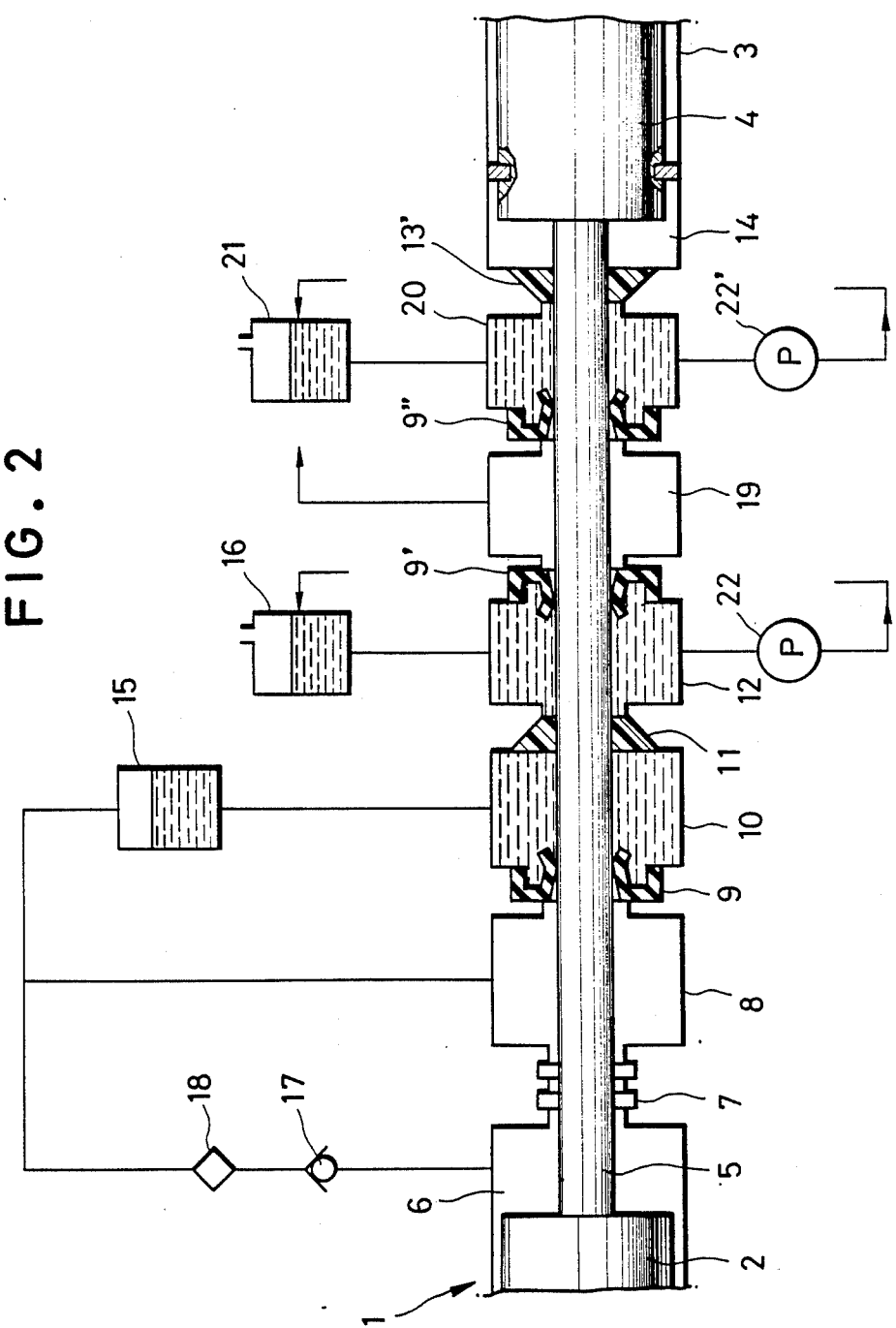

ROD SEAL DEVICE FOR STIRLING ENGINES

BACKGROUND OF THE INVENTION

1. Field of the Invention

This invention relates to a rod seal device for the Stirling engines and more particularly to a rod seal device for the Stirling engine which utilizes a guide piston at the power take-off structure as a part of the compressor for an air-conditioner using Freon gas as the working fluid.

2. Description of the Prior Art

In a prior art seal device for the Stirling engine shown in FIG. 1, Stirling engine generally indicated as numeral 1 includes operating piston 2 in the cylinder and a compression chamber 6 defined by the piston 2 and the cylinder. This compression chamber for an operating space is connected to anexpansion chamber (not shown) through cooler, heat exchanger and heater (all not shown). The operating piston 2 is connected to the guide piston 4 through a rod 5 which extends from the crank case 3 into the cylinder of the Stirling engine 1. The crank case 3 and the guide piston 4 will be served as the power take-off of the engine 1. The operating piston 2 reciprocates by the operating fluid such as for example Helium gas or Hydrogen gas in the compression chamber 6. Suchreciprocable movement of the piston 2 will reciprocate the guide piston 4 to compress a working fluid in the chamber 14 for operating the air-conditioner. Freon gas is usually used in the fluid chamber 14 for operating an air-conditioner. The seal device between the two pistons 2 and 4 includes from left to right in FIG. 1 gas seal 7, intermediate gas chamber 8, scraper seal 9, high-pressure oil chamber 10, oil seal 11, low-pressure oil chamber 12, and oil seal 13. In this conventional device, the high pressure oil chamber 10 is connected to the compression chamber 6 through high pressure oil reservoir 15, oil filter 16 and check valve 17. Further, the high pressure oil reservoir 15 is connected to the intermediate gas chamber 8 to keep the pressure in both chamber 8 and the reservoir 15 to the minimum pressure level of the operating gas pressure in the chamber 6. In other words, the pressure in the high pressure oil chamber 10 is kept to maintain the minimum operating gas pressure and the leakage of operating gas into the chamber 10 can be recovered by returning to the compression chamber 6 via check valve 17. The low pressure oil chamber 12 is connected to low pressure oil reservoir 16 which is open to the atmospheric pressure and the leakage of operating gas or the operating gas for the air-conditioner into the chamber 12 can be discharged to the atmosphere from the low pressure oil reservoir 16. This device, however, has a drawback that the two operating gases Helium and Freon may be mixed at the high pressure oil chamber 10 one from the chamber 6 and the other from the chamber 14 through the peripheral surface of the rod 5. The Freon gas may cause chemical reaction under the high ambient temperature thereby to produce an undesirable acid which causes corrosion of the various components of the assembly.

SUMMARY OF THE INVENTION

It is, therefore, an object of the present invention to provide an improved Stirling engine rod seal device which obviates the above conventional drawbacks. It is another object of the invention to provide an improved piston rod for Stirling engine.

It is a further object of the present invention to provide a rod seal device for Stirling engine which has a power take-off for air-conditioner apparatus. It is still a further object of the present invention to provide a rod seal device for Stirling engine comprising a seal means for preventing the operating fluid of the Stirling engine from mixing with the operating fluid for the power take-off device such as air-conditioner. Other features and advantages of the present invention will be apparent from the following description taken in conjunction with the accompanying drawings, in which like reference characters designate the same or similar parts or components throughtout the FIGS. thereof.

BRIEF DESCRIPTION OF THE DRAWINGS

FIG. 2 is a view similar to FIG. 1 but showing a preferred embodiment of the present invention.

DESCRIPTION OF THE PREFERRED EMBODIMENT

Figure 1:
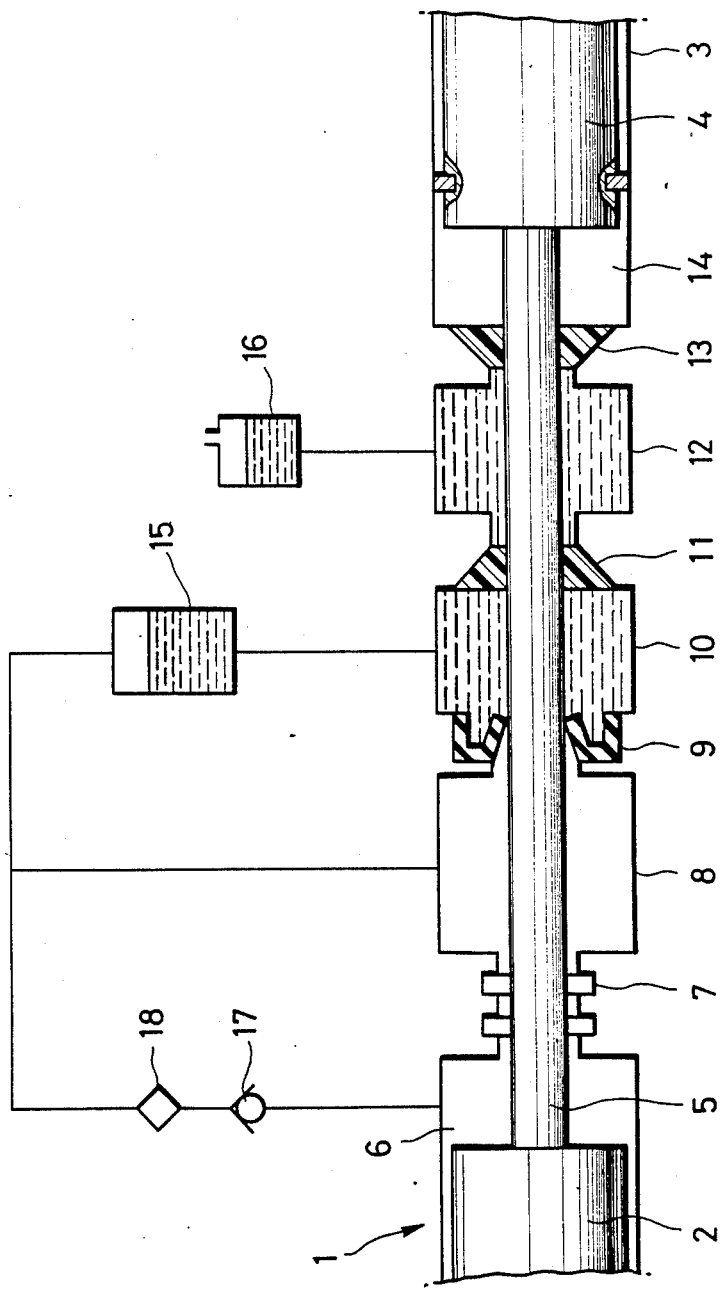
FIG. 1 is a schematic view showing a prior art rod seal device for the Stirling engine.

Referring now to FIG. 2, same or similar part or components bear the same reference characters shown in FIG. 1 and detail explanation has been omitted. Between the low pressure oil chamber 12 for the working fluid and the oil seal 13' for the fluid chamber 14 for the Freon gas, first scraper seal 9', a chamber 19 exposed to the atmospheric pressure, second scraper seal 9" and a further low pressure oil chamber 20 for the Freon gas are disposed from left to right around the rod 5. The low pressure oil chamber 12 is connected to the low pressure oil reservoir 16 through a pump 22, while the further low pressure oil chamber 20 for the Freon gas is connected to another low pressure oil reservoir 21 through oil pump 22' to forcibly circulate the oil in the chambers 12 and 20 to discharge any gases introduced thereinto to the atmospheric pressure. It is particularly effective for the engine vertically disposed. In such vertical engine structure, the chambers 12 and 20 have to be disposed vertically and gases therein are apt to remain in the chambers compared to the laterally disposed type. As described above, the working gas for the air-conditioner will not be mixed with the working fluid for the Stirling engine 1 due to the provision of the independent low pressure oil chambers for respective working fluids. As many apparently various and other embodiments of the present invention can be made without departing from the spirit and scope of the invention, it is to be understood that the invention is not limited to the specific embodiment illustrated above except as defined in the appended claims.

What is claimed is:

1. A rod seal device for a Stirling engine, comprising:
    a piston rod having a first end connected to an operating piston for the engine and a second end connected to a guide piston disposed in a crank case;
    a compression chamber defined by said operating piston and a cylinder of the engine and including therein a working gas for the engine;
    a first intermediate chamber surrounding an outer periphery of said piston rod and being connected to said compression chamber and kept to maintain a minimum level of pressure of said working gas;
    a high pressure oil chamber disposed next to said first intermediate chamber and surrounding the outer periphery of said piston rod, said high pressure oil chamber being connected to said compression chamber via a check valve to recirculate the working gas leaked thereinto to said compression chamber;

a first low pressure oil chamber disposed next to said high pressure oil chamber via an oil seal member and surrounding the outer periphery of said piston rod, said first low pressure oil chamber being connected to a first low pressure oil reservoir which is exposed to the atmospheric pressure to discharge any gas introduced into said first low pressure oil chamber to the atmosphere;

a first scraper seal disposed next to said first low pressure oil chamber and surrounding the outer periphery of said piston rod;

a second intermediate chamber disposed next to said first low pressure oil chamber via said first scraper seal and surrounding the outer periphery of said piston rod, said second intermediate chamber being exposed to the atmosphere for allowing any gas introduced thereinto to be discharged to the atmosphere;

a second scraper seal disposed next to said second intermediate chamber and surrounding the outer periphery of said piston rod;

a second low pressure oil chamber disposed next to said second intermediate chamber via said second scraper seal and surrounding the outer periphery of said piston rod, said second low pressure oil chamber being connected to a second low pressure oil reservoir which is open to the atmospheric pressure to discharge any gas introduced into said second low pressure oil chamber to the atmosphere;

a second oil pump disposed between said second low pressure oil chamber and said second low pressure oil reservoir to positively discharge any gas introduced into said second low pressure oil chamber to he atmosphere; and a further oil seal disposed between said second low pressure oil chamber and a working gas chamber in said crank case for a power take-off device.

2. A rod seal device according to claim 1, further comprising:

a first oil pump disposed between said first low pressure oil chamber and said first low pressure oil reservoir to positively discharge any gas introduced into said first low pressure oil chamber to the atmosphere.

3. A rod seal device according to claim 1, further comprising a further scraper seal disposed between said first intermediate chamber and said high pressure oil chamber and surrounding the outer periphery of said piston rod.

* * * * *